Figure 1:
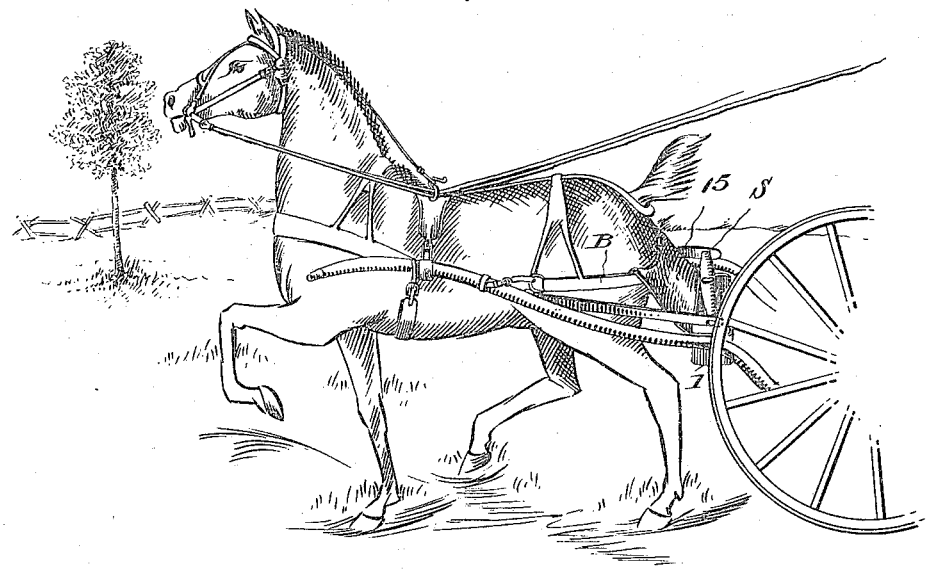

R. A. & J. A. RICE.
MANURE POUCH.
APPLICATION FILED JUNE 2, 1913.

1,136,272.

Patented Apr. 20, 1915.
2 SHEETS—SHEET 1.

Inventors
Royal A. Rice
and Joel A. Rice
By H. B. Willson & Co.
Attorneys

Witnesses

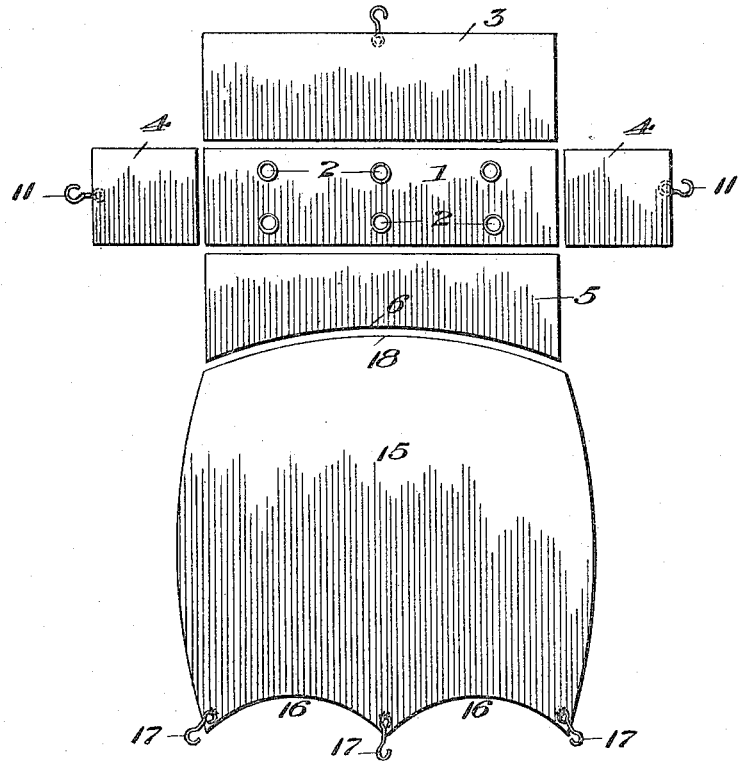
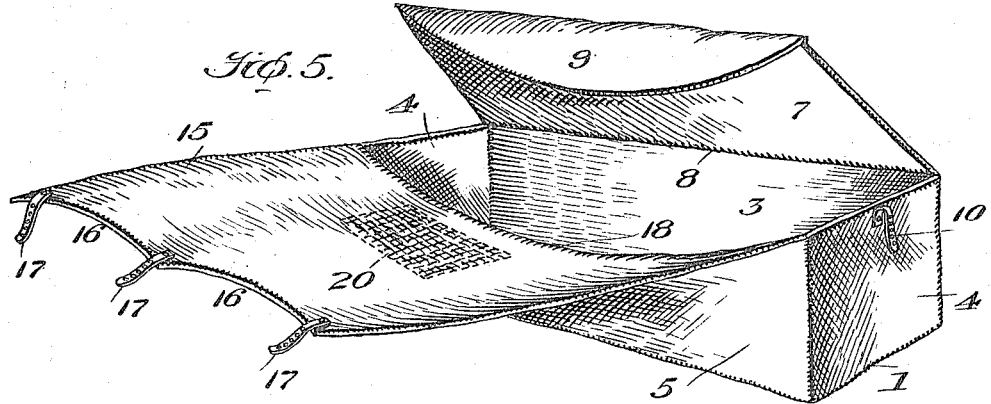

UNITED STATES PATENT OFFICE.

ROYAL ALONZO RICE AND JOEL ALFONZO RICE, OF NEW YORK, N. Y.

MANURE-POUCH.

1,136,272. Specification of Letters Patent. Patented Apr. 20, 1915.

Application filed June 2, 1913. Serial No. 771,349.

*To all whom it may concern:*

Be it known that we, ROYAL A. RICE and JOEL A. RICE, citizens of the United States, residing at New York, in the county of New York and State of New York, have invented certain new and useful Improvements in Manure-Pouches; and we do declare the following to be a full, clear, and exact description of the invention, such as will enable others skilled in the art to which it appertains to make and use the same.

This invention relates to animal husbandry, and more especially to manure pouches; and the object of the same is to construct a device of this kind for attachment to a wagon, carriage, or buggy and a horse hitched thereto, to catch the excrement dropped by the animal and to keep it off of the pavement and out of the carriage.

This object is accomplished by constructing the device in a manner hereinafter more fully described and claimed and as shown in the drawings wherein—

Figure 2:
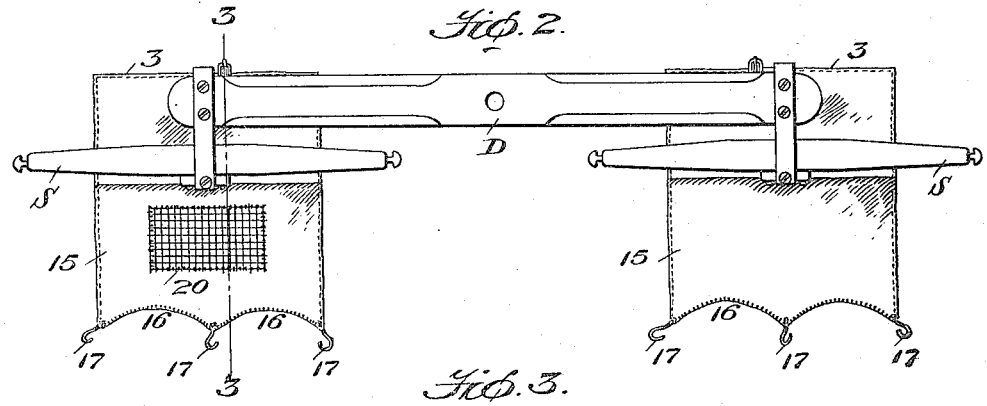
Figure 3:
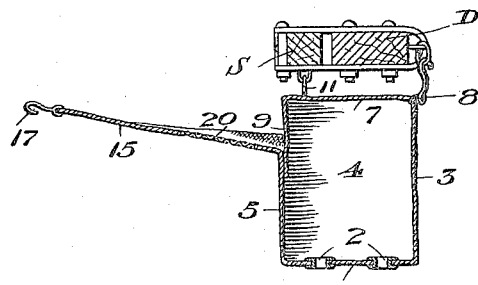

Figure 1 is a side elevation, partly in perspective, showing a horse hitched to a buggy and the same as provided with one of our improved pouches; Fig. 2 is a plan view of a double tree carrying two swingletrees, and a pouch secured under each of the latter; Fig. 3 is a cross section on the line 3—3 of Fig. 2; Fig. 4 is a plan view of the blanks from which the pouch is made; and Fig. 5 is a perspective view of the pouch on an enlarged scale.

In Fig. 1 of the drawings is shown a horse hitched to the swingletree S of a buggy, and the only portion of the harness to which we need refer in this specification is the breech strap B.

In Figs. 2 and 3 of the drawings is shown a double tree D, with whiffletrees or swingletrees S attached to both ends thereof.

In so far as possible our device is adapted to the various forms of vehicles and the various styles of harness, and if necessary to make it fit either of these it may be modified in some details, in a manner which will be clearly understood without further explanation.

We may say at this point that the material or materials of which this device is constructed is not important, as it may be of metal, gauze, fabric or other material or combination of materials; and furthermore the proportions and exact shape of parts are likewise capable of variation.

On the assumption that the material is fabric, the blanks from which this manure pouch is made are best seen in Fig. 4, and the finished article in Fig. 5. It comprises a bottom 1 provided with perforations 2 which are preferably reinforced by eyelets, a rear wall 3, two end walls 4, and a front wall 5 dished at its upper edge as at 6; and when these various walls are raised and connected along their meeting edges the device appears as in Fig. 5. A cover 7 is also provided which is flexibly connected as at 8 to the upper edge of the rear wall 3, as by being integral therewith or stitched thereto, and hanging from the front edge of this cover is a flap 9 which is curved to conform with the curvature of the dished edge 6 and is perhaps of sufficient length to hang down below said edge—the purpose of this flap being to hide the contents of the pouch, although as it swings inward it does not obstruct entrance thereto. Straps 10 as seen in Fig. 5 or snap hooks 11 as seen in Fig. 4 are attached to the upright walls and constitute fastening devices by means of which the pouch can be supported from something. If it be hung beneath a swingletree as shown in Figs. 1 and 3, the snap hooks engage eyes 12 on the under side thereof, but obviously these could be buckles if preferred, and then the straps shown in Fig. 5 would be used.

The other member is an apron 15 whose front end is shaped in scallops 16 to closely fit the rump of the horse and is provided with fastening devices 17 which again may be hooks or straps and which are to be connected with the breeching B or other portions of the harness as shown in Fig. 1. The rear end of the apron is attached as at 18 to the dished upper edge 6 of the front wall 5, and therefore this apron will of course be transversely dished or curved so that excrement dropped thereinto will tend to roll toward the center and will be delivered to and through the mouth of the receptacle into the interior of the latter under the flap 9, and without dropping onto the pavement. The dimensions of this apron will be such as are necessary; and, especially with respect to its length, it may be varied considerably as some horses are hitched near to and others more remote from the whiffletree. It is not necessary or desirable that it should be drawn taut, but on the other hand it should not be sufficiently loose to permit it to trap the material dropped into it, for the purpose of the apron is, as its name indicates, to catch and convey the material into the receptacle. The apron of our pouch which is to be attached to a mare will be provided with a section of wire screen as indicated at 20 in full lines in Fig. 2 and in dotted lines in Fig. 5, for an obvious purpose. Particular attention is directed to the flap 9 which we desire always to make of sufficient length to hang inside the front wall 5 at its curved upper edge 6, to thoroughly conceal the contents of the receptacle. Furthermore, the dishing of the upper edge 6 results in the dishing of the apron itself, with the advantages explained, and this can be maintained by dishing its front edge through the attachment of the fastening devices 17 at proper points on the harness—especially if they be straps as shown at 10 in Fig. 5 which will engage buckles on the harness and are therefore readily adjusted.

When it is desired to empty and cleanse this device, it is detached from the harness and from the swingletree, and inverted; this causes the contents to fall out as the cover 7 opens to permit, and thereafter the receptacle and the flap and the apron may be cleaned by turning a hose onto them. When the parts are replaced and reattached to the vehicle, the device is ready for use at any time the horse is hitched thereto, by simply connecting the front attaching devices 17 to the harness in a manner which will be clear. We might say, although this feature is not illustrated in the drawings, that if the receptacle be made of fabric, it may be well to stiffen it with a wire frame.

However, it is not impossible that the entire receptacle could be made of metal with the cover hinged to the rear wall 3, so long as the apron is flexible and will not, therefore, annoy the animal.

What is claimed as new is:

A device of the class described comprising a substantially rectangular receptacle formed of flexible material and having a perforated bottom, the front wall of said receptacle being dished downwardly, a flexible cover for the receptacle hinged to the upper edge of the rear wall thereof and provided at its forward edge with a depending integral flap, said flap being adapted to contact with the inner face of the front wall of said receptacle when the cover thereof is lowered and the lower edge of said flap being convexed coincident to the curvature of the dished upper edge of said front wall, said convexed lower edge of the flap also projecting to points below the dished upper edge of the front wall when said cover is lowered to entirely cover the front of said receptacle, and an apron connected at its inner end to the dished edge of said front wall, said flap on the cover yielding under pressure of material directed thereagainst from the apron to admit the same to the receptacle.

In testimony whereof we have hereunto set our hands in presence of two subscribing witnesses.

ROYAL ALONZO RICE.
JOEL ALFONZO RICE.

Witnesses:
AGNES SCHANO,
J. T. RICE.

Copies of this patent may be obtained for five cents each, by addressing the "Commissioner of Patents, Washington, D. C."